US008391612B2

(12) United States Patent
Natroshvili et al.

(10) Patent No.: US 8,391,612 B2
(45) Date of Patent: Mar. 5, 2013

(54) EDGE DETECTION WITH ADAPTIVE THRESHOLD

(75) Inventors: Koba Natroshvili, Waldbronn (DE); Ayyappan Mani, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 370 days.

(21) Appl. No.: 12/846,297

(22) Filed: Jul. 29, 2010

(65) Prior Publication Data

US 2012/0026352 A1 Feb. 2, 2012

(30) Foreign Application Priority Data

Jul. 29, 2009 (EP) .................................... 09009803

(51) Int. Cl.
*G06K 9/00* (2006.01)
*G06K 9/48* (2006.01)

(52) U.S. Cl. .......................... 382/199; 382/103; 382/104

(58) Field of Classification Search .................. 382/103, 382/104, 106, 108, 199, 270
See application file for complete search history.

(56) References Cited

U.S. PATENT DOCUMENTS

| 7,336,847 B2 * | 2/2008 | Duan ........................... 382/266 |
| 8,055,102 B1 * | 11/2011 | Sahu ........................... 382/300 |
| 2007/0014482 A1 * | 1/2007 | Kim et al. ..................... 382/254 |

OTHER PUBLICATIONS

Er-Sen, Li, et al.; An Adaptive Edge-detection Method Based on the Canny Operator; 2009 International Conference on Environmental Science and Information Application Technology; 2009 IEEE; pp. 465-469.

Yan, Fabao, at al.; Edge Detection of Tank Level IR Imaging Based on the Auto-adaptive Double-threshold Canny Operator; Second International Symposium on Intelligent Information Technology Application; (1) Southwest institute of Automation Research, Mianyang, Sichuan, 621000, China; (2) College of Information Science & Engineering, Harbin Institute of Technology, HIT, Weihai, Shandong, 264209, China; and (3) University of Electronic Science and Technology of China, UESTC, Chengdou, Sichuan, 610054, China; 2008 IEEE; pp. 366-370.

Garcia-Garrido, Miguel Angel et al.; Time Driving-Aid System for Different Lighting Conditions, on Board a Road Vehicle; Department of Electronics, Escuela Politecnica Superior, University of Alcala, Alcala de Henares, Madrid, Spain; 2006 IEEE; pp. 621-626.

Garcia-Garrido, Miguel Angel et al.; Fast Traffic Sign Detection and Recognition Under Changing Lighting Conditions; Proceedings of the IEEE ITSC 2006; 2006 IEEE Intelligent Transportation Systems Conference, Toronto, Canada; Sep. 17-20, 2006; pp. 811-816.

\* cited by examiner

*Primary Examiner* — Brian Le
(74) *Attorney, Agent, or Firm* — O'Shea Getz P.C.

(57) ABSTRACT

Systems and methods are provided for detecting edges in an image. In an example method, the image is smoothed using a filter. A gradient magnitude and angle are determined for each pixel of the image. A non-maximum suppression is performed on the resulting image data. A double threshold with an upper and a lower threshold are applied to the resulting image data to determine the edges in the image. The upper and the lower thresholds are calculated automatically using a distribution of intensity values of the image. In example systems, an image is acquired by a camera, or other image acquisition units. An image processing unit is configured to detect the edges in the image using an adaptive threshold edge detection method.

12 Claims, 7 Drawing Sheets

EDGE DETECTION WITH ADAPTIVE THRESHOLD

RELATED APPLICATIONS

This application claims priority of European Patent Application Serial Number 09 009 803.9, filed on Jul. 29, 2009, titled EDGE DETECTION WITH ADAPTIVE THRESHOLD, which application is incorporated in its entirety by reference in this application.

BACKGROUND

1. Field of the Invention

This invention relates to image processing system and methods, and more particularly, to systems and methods for detecting edges in an image.

2. Related Art

Image processing systems typically include a camera and components for processing an image signal from the camera. The camera may capture images as digital image data using well-known techniques. The camera may also capture images as analog data, which may be converted to digital image data using well known techniques. The signal processing components may perform image processing functions on the obtained image data in accordance with the application in which the image processing system is utilized. Typical applications use the image processing functions to analyze the image data to detect characteristics of the subject matter of the image. The application may draw conclusions based on the characteristics detected on the image, or perform other functions using the knowledge of the characteristics.

One example of an image processing function is an edge detection function in which image data is analyzed to identify edges, which may appear on the image as lines that separate areas of different intensity magnitudes. Edge detection functions in image processing systems are typically designed to mark or identify as many real edges in the image as possible. The extent to which real edges are marked determines the extent to which an edge detection is a good detection. Edge detection should also achieve a good localization by marking edges as close as possible to the edge in the real image. In addition, a point in the image data that is determined to be an edge point should be as close as possible to a true edge center. The edge detection should also provide a minimal response such that a given edge in the image is marked once and image noise does not create false edges.

Different methods are available to perform edge detection on an image. One example is known as the "Canny filter," which is named after its developer. Canny filtering involves using a Gaussian filter to smooth the acquired image to produce a slightly blurred version of the original image that is not affected by a single noisy pixel. This helps prevent falsely detecting noise as an edge. The Canny filter method also involves determining a gradient magnitude and angle for each pixel, and detecting the horizontal, vertical and diagonal edges in the blurred image. A non-maxima suppression is performed on the gradient magnitude image by determining whether the gradient magnitude assumes a local maximum in the gradient direction. The non-maxima suppression helps to correctly localize the edge, and to reduce the width of an edge having a width of more than one pixel in the image to the width of one pixel. At an edge where the real width is more than one pixel, the actual edge is deemed to be located at a position where the moment of the gradient has a maximum value. All pixels for which a maximum was determined are kept, whereas the other pixels are set to zero.

A double thresholding or hysteresis thresholding is performed using an upper threshold $T_2$ and a lower threshold $T_1$. The edges that were identified after non-maxima suppression have different intensity values. The image obtained after non-maxima suppression may still contain false edges. False edges are edges in which the gradient is lower than a predetermined threshold. The predetermined threshold actually includes two thresholds, the lower threshold $T_1$ and the upper threshold $T_2$. All pixels in the gradient image having an intensity higher than the upper threshold $T_2$ are considered real edges in the image. All edges having an image intensity lower than $T_1$ are considered false thresholds and are set to zero. The pixels having a gradient intensity higher than $T_1$ and lower than $T_2$ are considered as being an edge when at least one neighboring pixel is also considered an edge pixel. If, however, both neighboring pixels in the direction of the edge are not considered to be an edge pixel, then pixels having a gradient intensity higher than $T_1$ and lower than $T_2$ are not considered to be edge pixels.

Known Canny filter techniques set the two thresholds $T_1$ and $T_2$ to fixed values. However, maintaining the two thresholds fixed may lead to poor edge detection results in environments involving different brightness situations, such as, for example, during the night, or in a foggy or rainy environment. In addition, a multitude of images may be acquired per second and then analyzed to identify objects in the images with high precision. The edge detection should be fast and reliable.

Accordingly, a need exists for improved detection of edges in images that are taken in changing weather conditions or in environments of varying brightness.

SUMMARY

In view of the above, a system and method are provided for detecting edges in an image. In an example method, the image is smoothed using a filter. A gradient magnitude and angle are determined for each pixel of the image. A non-maximum suppression is performed on the resulting image data. A double threshold with an upper and a lower threshold are applied to the resulting image data to determine the edges in the image. The upper and the lower thresholds are calculated automatically using a distribution of intensity values of the image.

In an example system, an image is acquired by a camera, or other image acquisition units. An image processing unit is configured to detect the edges in the image using an adaptive threshold edge detection method.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
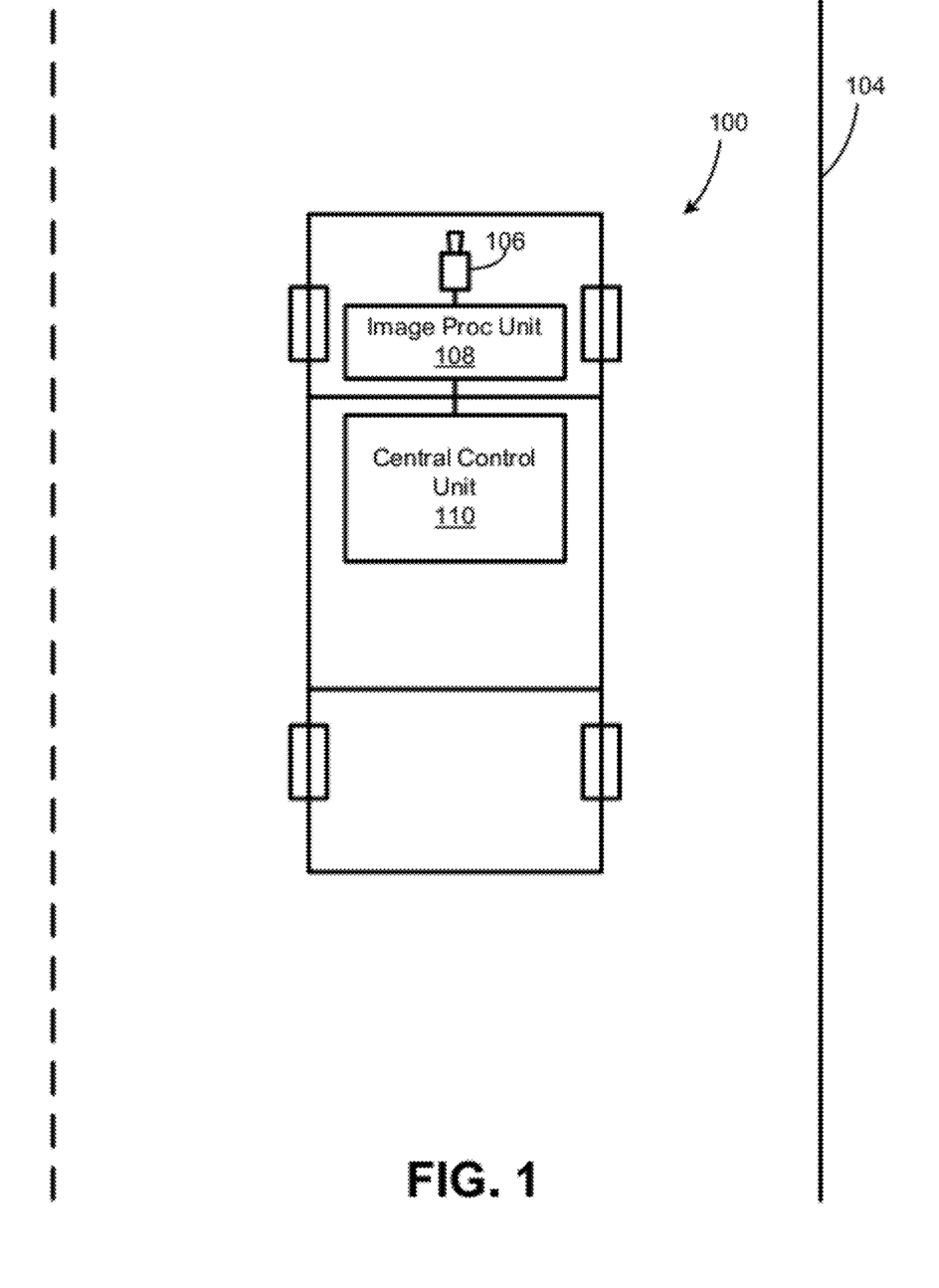
FIG. 1 is a schematic diagram of a vehicle containing an imaging system that performs edge detection using adaptive determination of the image threshold.

FIG. 1 is a schematic diagram of a vehicle 100 containing an imaging system that performs edge detection using adaptive determination of the image threshold. The vehicle 100 is illustrated on a road 104 and includes a camera or image acquisition unit 106. The camera 106 may operate in a driver assist system in which the camera 106 captures images of the front of the vehicle 100, or of the back of the vehicle to detect possible obstacles for the vehicle as it moves on the road 104. The camera 106 may be connected to an image processing unit 108 that receives the images acquired by the camera 106 and processes the acquired images in accordance with functions of the application that performs image processing. One function that may be performed by the application is to detect edges in the image. The detected edges may be compared to predetermined contours stored in a database (not shown) in order to recognize the objects contained in the image. For example, the image may be processed to recognize objects that include objects on or near the road, such as traffic signs, other vehicles, pedestrians or any other object that may be relevant to the application.

The image processing unit 108 may communicate the result of the image recognition or object detection to a central control unit 110 for processing the received information. The central control unit 110 may inform the driver of the recognized object. The central control unit 110 may also receive the information and automatically inform the driver, modify the speed of the vehicle, and perform any other action. In a vehicle environment, particularly in a driver assist system, several images may be acquired per second for processing within a short delay time. The delay time should be sufficiently short to permit the driver to quickly react to the edge detection results. For example, based on the detected edges, a driver assist system may recognize a dangerous object in front of the vehicle or may detect a bend for which the driver should slow down the vehicle velocity in order to safely navigate the bend.

It is noted that while examples of edge detection are described below in the context of image processing in vehicles, the use of the edge detection methods are not limited to vehicle applications. The example edge detection methods may also be used to detect contours in a medical image or may be used in any other technical field where it is important to reliably detect contours or edges in an image.

Figure 2:
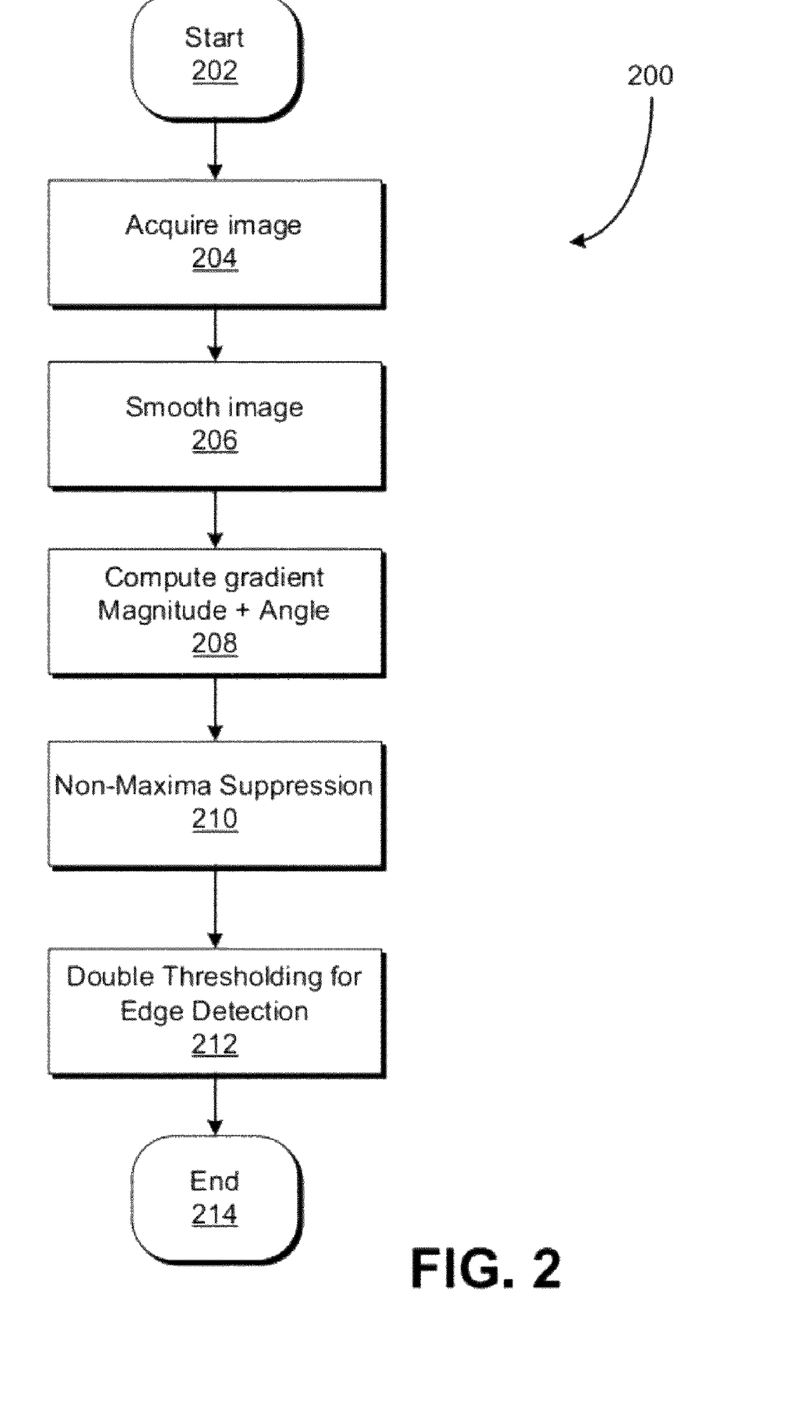
FIG. 2 is a flow chart illustrating operation of an example edge detection method.

FIG. 2 is a flow chart illustrating operation of an example edge detection method 200. The edge detection method 200 may be invoked by another function being performed by the image processing unit 108 in FIG. 1 at step 202. For example, the image processing unit 108 may include an application that performs object detection or recognition using the edge detection method 200. After the edge detection method 200 is invoked at step 202, the image is acquired at step 204. The image may be acquired from the camera 106 in FIG. 1, or from memory in implementations that process stored image data.

The edge detection method 200 may be affected by noise present in the acquired image. To reduce the effect of noise, the image is smoothed at step 206. In one example, implementation, the image may be smoothed by convolving the image with a Gaussian filter. At step 208, the gradient magnitude and direction are determined for each pixel of the smoothed image. Also at step 208, the horizontal, vertical and diagonal edges are determined. An edge detection operator, such as for example Roberts, Prewitt or Sobel, returns a value for the first derivative of the horizontal direction and the vertical direction and used to determine the edge gradient and direction. At step 210, a search is performed to determine if the gradient magnitude is a local maximum in the gradient direction. Steps 202 to 210 may be performed as similar steps of the Canny filter method, which is known to those of ordinary skill in the art. Therefore, a more detailed description of steps 202 to 210 is not necessary.

At step 212, a double thresholding is performed for the edge detection using adaptively determined thresholds as described in more detail with reference to FIG. 3. The edge detection method 200 may end and return results to its invoking application at step 214, or may return to step 204, where a next image is acquired and where the thresholds are determined adaptively depending on the histogram of the newly acquired image.

Figure 3:
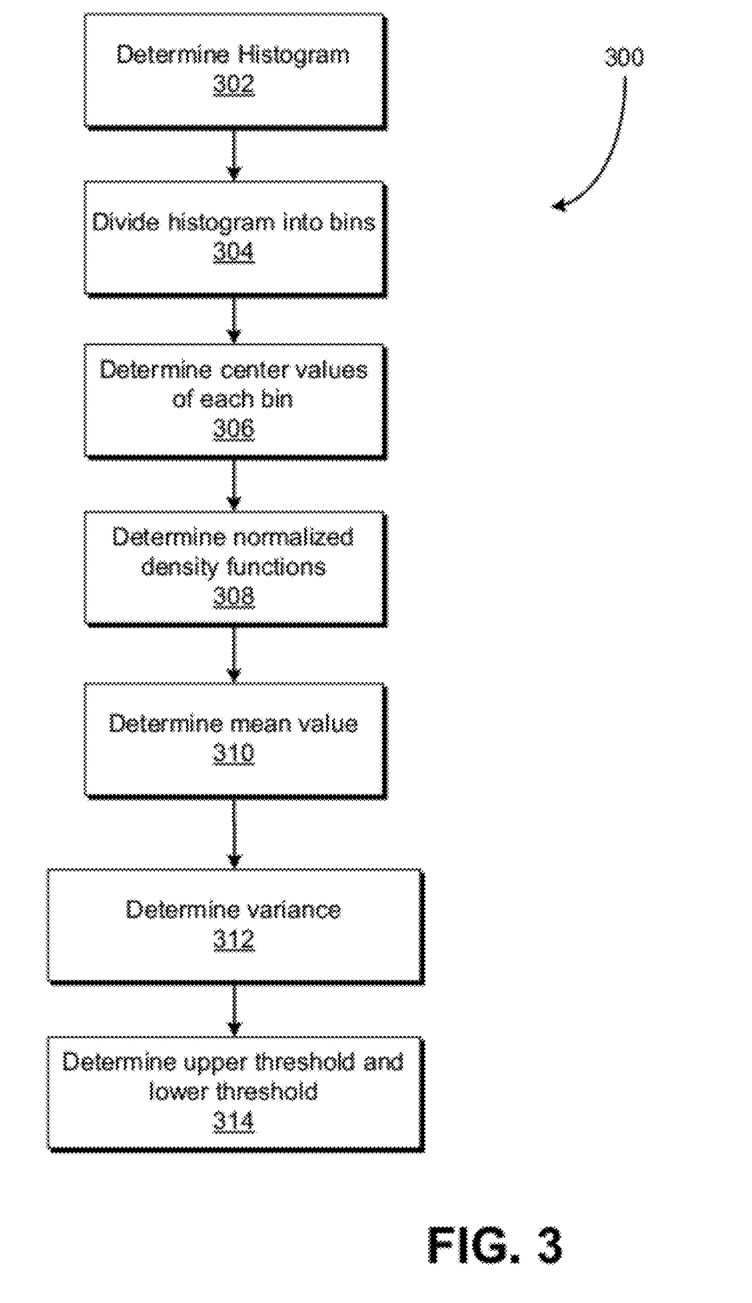
FIG. 3 is a flow chart illustrating an example method for determining the adaptive upper and lower threshold.

FIG. 3 is a flow chart illustrating an example method 300 for determining the adaptive upper and lower threshold. At step 302, a histogram is generated for the image. A histogram is a density plot of the intensity values. The histogram of the image may be divided into a predetermined number of bins, each bin containing a range of intensity values. For example, in the case of an 8 bit image data set, the intensity values range from 0 to 255. In this example, the histogram from 0 to 255 may be divided into 8 bins, the bins remaining the same for the series of images. In an alternative example, the histogram may be divided into a different number of bins. The number of bins used in examples described below, in applications for vehicles, is between 5 and 10. The same number of bins can also be used for an image having a larger range of intensity values, such as intensity values from 0 to 4095 or any other intensity range. As will be explained below with reference to FIG. 3, the number of bins may affect the computing time for computing the upper and the lower threshold. The lower the number of bins, the lower the computing time. However, if the number of bins is too low, the approximation errors may become too high, resulting in unsatisfactory determinations of the upper and lower threshold.

At step 304, the complete range of intensity values is divided into a predetermined number of bins, such as for example 8 bins. The 8 bins are formed by dividing the complete range of intensity values into 8 equal intervals. Using MATLAB or similar tools, the borders of the bins may be calculated using:

$$\frac{A \cdot (p - 1.5)}{n - 1} \leq x \leq \frac{A \cdot (p - 0.5)}{n - 1} \quad (2)$$

Where:
n is the number of bins,
p is the numerical order of the bins, and
A is the maximum intensity value.
Where n=8 bins, p will vary from 1 to 8. In the example below, A, the maximum intensity value, may be 255, which corresponds to the maximum value for an 8 bit image. Using equation (2), the bin borders of the 8 bins (p=1 to 8) may be calculated with the following result:

| p = 1 | p = 2 | p = 3 | p = 4 | p = 5 | p = 6 | p = 7 | p = 8 |
|---|---|---|---|---|---|---|---|
| −18.21 | 18.21 | 54.64 | 91.07 | 127.50 | 163.92 | 200.35 | 236.78 | 273.21 |

The first and the last bins have the following ranges: [−18.21:18.21] and [236.78:273.21]. For an 8 bit image, the range of intensity values is 0 to 255. Therefore, the first and the last bins are smaller than the other ones: the first bin ranges from 0 to 18.21, and the last bin ranges from 236.78 to 255. At step 306, the center intensity value is calculated for each bin. For the above-described division into eight bins, the following center intensity values may be calculated:

| p = 1 | p = 2 | p = 3 | p = 4 | p = 5 | p = 6 | p = 7 | p = 8 |
|---|---|---|---|---|---|---|---|
| 0 | 36.42 | 72.85 | 109.28 | 145.71 | 182.14 | 218.57 | 255.00 |

In the illustrated example implementation, the center intensity value of 36.42 is the center intensity value for the bin p=2, which ranges in intensity value from 18.21 to 54.64. It is noted that the centers are not the real geometrical centers in the case of the first and the last bin. It is to be understood that the division of the histogram into bins and the determination of the center intensity values for each bin may be determined in other ways. The range of intensity values may also be divided into another number, p, other than 8 bins. The number of bins may be selected based on the desired precision and on the time available to determine the edges per image.

At step 308, the normalized density functions for the different bins may be calculated. If the initial histogram function was f(x), the normalized functions may be expressed as:

$$f_{norm}(i) = \frac{f(i)}{\sum_{1}^{8} f(i)} \qquad (3)$$

Where:
f(i) is the number of pixels in bin i.

The term in the denominator corresponds to the sum of pixels in the different bins corresponding to the total number of pixels of the image. In an example, for an image matrix of 20 times 20 pixels, the first bin ranging from 0 to 36.42 may contain 20 pixels $f_{norm}$(bin1) being 20/400. Therefore, in determining the normalized density functions, the number of pixels in each bin is determined, which is used to calculate the normalized density for the different bins. The sum of normalized probability density functions may be considered as a normalized probability density function of intensity values. In this case, the mean value and the variance may be obtained as the first and second derivative of the normalized probability density function. The mean value of the probability density function may be determined at step 310 by:

$$\mu = \sum_{1}^{8} f_{norm}(i) \cdot x(i) \qquad (4)$$

Where:
x(i) is the center intensity value of each bin.

The variance can be calculated at step 312 using:

$$\sigma^2 = \sum_{1}^{8} f_{norm}(i) \cdot (x(i) - \mu)^2 \qquad (5)$$

In determining the mean value and the variance, the histogram is assumed to contain one major peak. This assumption may not be accurate for the histograms of the acquired images, as these histograms may contain two or more peaks. Nevertheless, this assumption has been shown to provide good edge detection results. When the variance has been determined at step 312, the upper threshold and the lower threshold may be determined in step 314 using the following equations:

$$T_1 = \max(0, (\mu - \sigma)/a) \qquad (6)$$

$$T_2 = \min(A, (\mu + \sigma)/b) \qquad (7)$$

Where:
a is a parameter between 5 and 7,
b is a parameter between 2 and 4,
A is the maximum intensity value.

Figure 4:
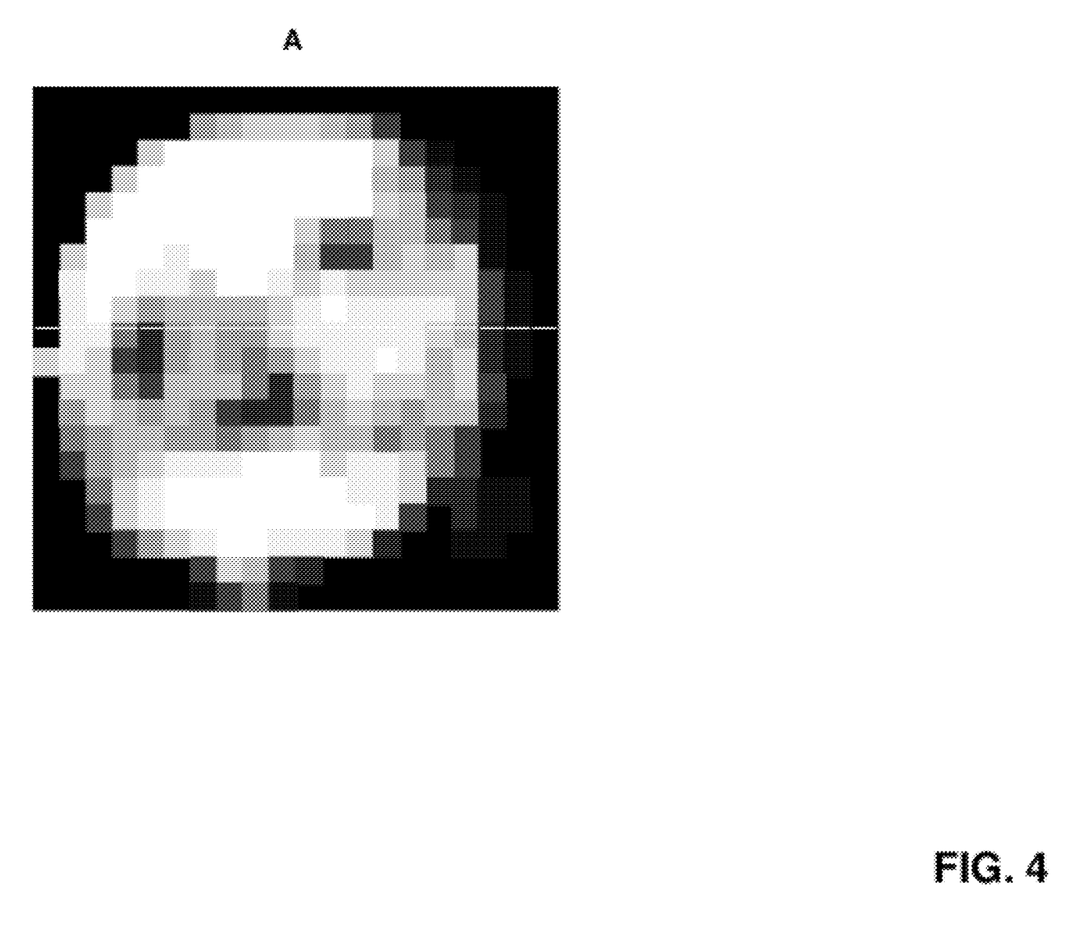
FIG. 4 is an example of an image on which an edge detection may be performed.
Figure 5:
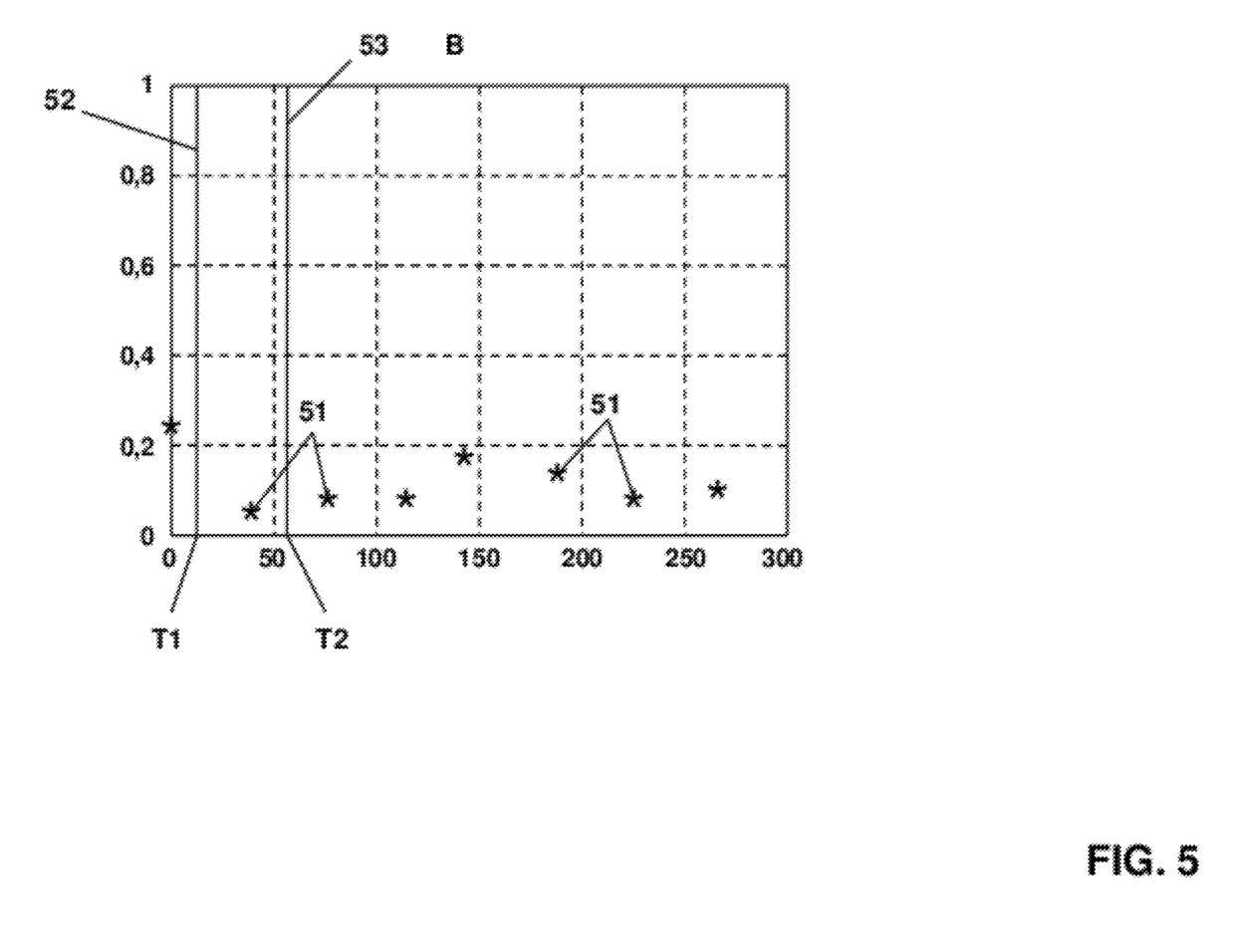
FIG. 5 is a graph illustrating the separation of intensity values into bins and the determined lower and upper thresholds $T_1$ and $T_2$.

FIGS. 4-7 illustrate an example of performing an edge detection on an image. FIG. 4 is an example of an image on which an edge detection may be performed. The image in FIG. 4 depicts a traffic sign for a speed limit of 60 captured as image data having 20×20 pixels, which provides a rather poorly visible traffic sign. FIG. 5 is a graph illustrating the separation of intensity values into bins and the determined lower and upper thresholds $T_1$ and $T_2$. The graph in FIG. 5 is a histogram generated using a normalized probability density function. A plurality of stars 510 shown in the histogram show the normalized density functions at the center intensity values of each bin. Furthermore, the two thresholds, the upper and the lower threshold $T_2$ and $T_1$, are shown as calculated as mentioned above. Line 520 is a lower threshold $T_1$, and line 530 is an upper threshold $T_2$.

Figure 6:
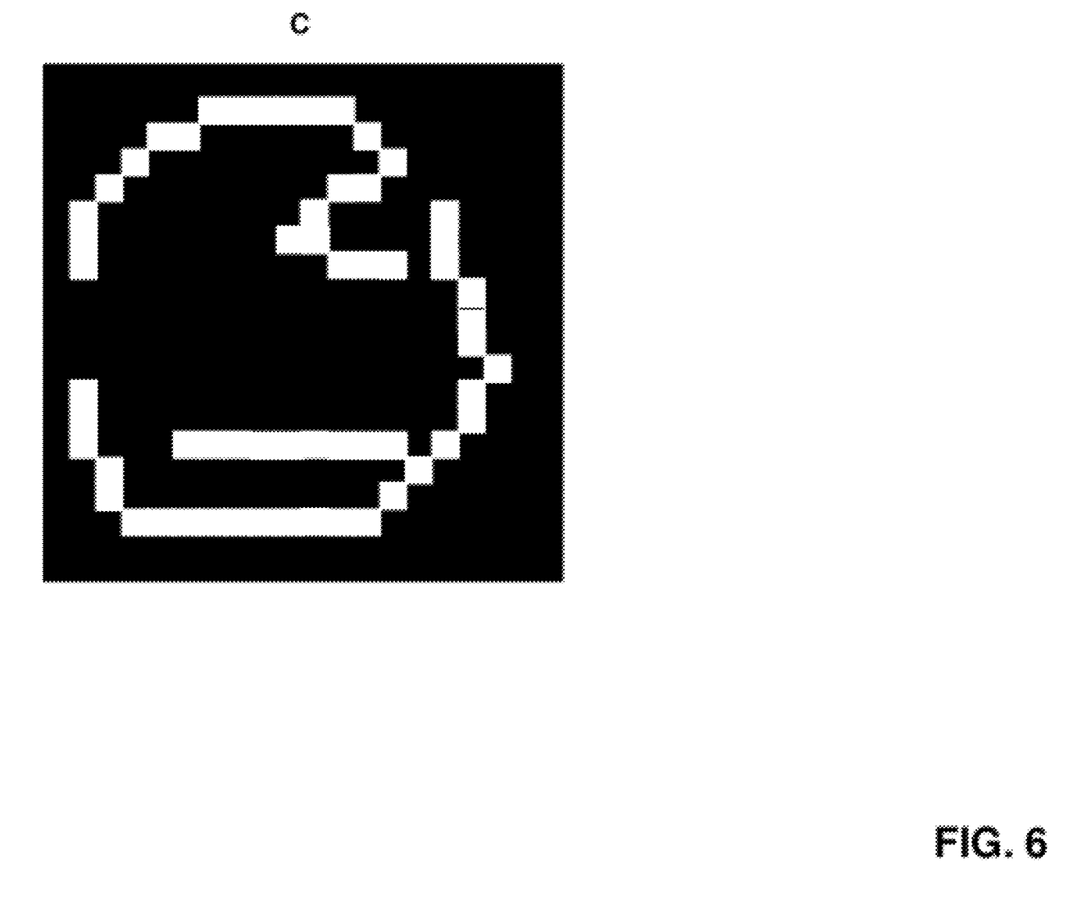
FIG. 6 illustrates an example of an edge detection result of an edge detection method applied to the image of FIG. 4 using a filter with a non-adaptive determination of the thresholds.
Figure 7:
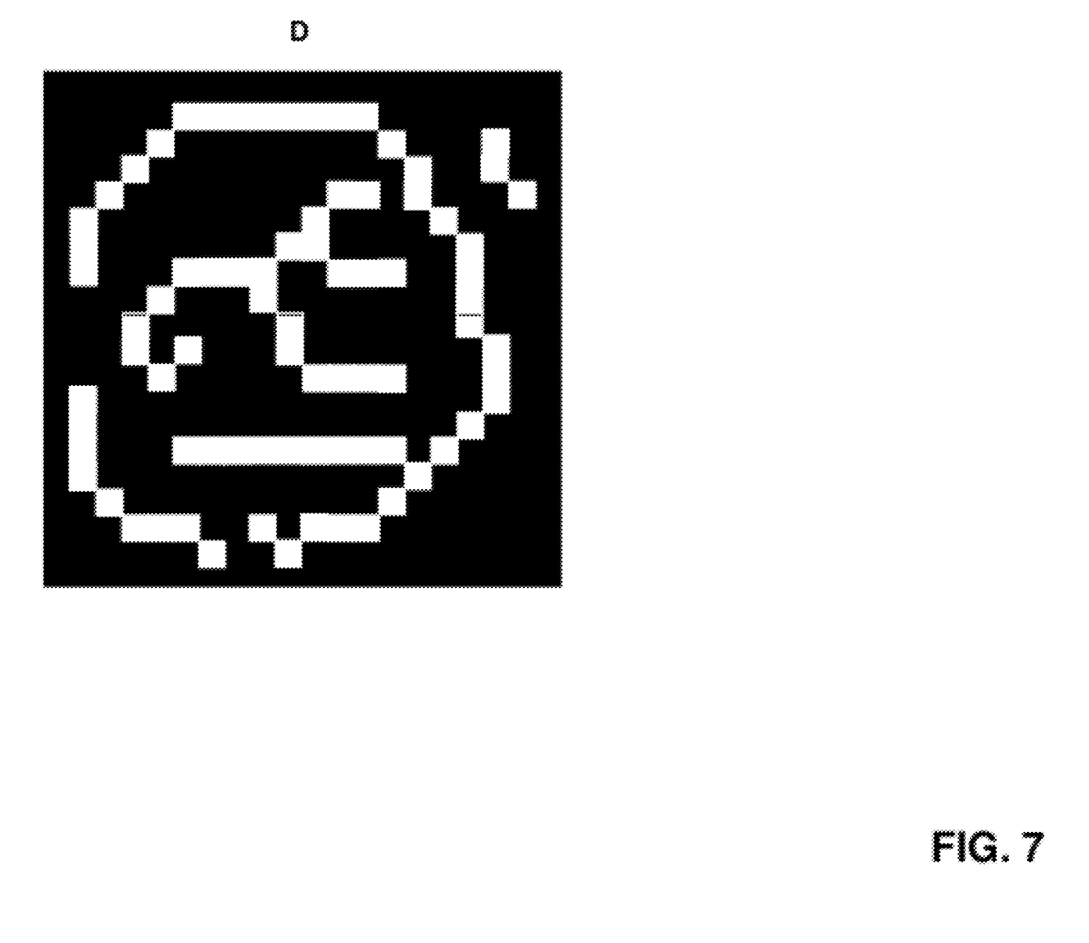
FIG. 7 illustrates an example of an edge detection result using a filter with adaptive determination of the thresholds.

FIG. 6 shows an image resulting from using a Canny filter method that implements a fixed upper and lower threshold. FIG. 7 shows an image resulting from using an example edge detection method using adaptively determined thresholds, $T_1$ and $T_2$. A comparison of FIGS. 6 and 7 reveals that more edges were detected in FIG. 7 using the adaptive determination of the two thresholds. The difference in performance between the two methods may be even greater for images taken in a dark environment or in rainy conditions.

It will be understood, and is appreciated by persons skilled in the art, that one or more processes, sub-processes, or process steps described in connection with FIGS. 1-3 may be performed by hardware and/or software. If the process is performed by software, the software may reside in software memory (not shown) in a suitable electronic processing component or system such as, one or more of the functional components or modules schematically depicted in FIG. 1. The software in software memory may include an ordered listing of executable instructions for implementing logical functions (that is, "logic" that may be implemented either in digital form such as digital circuitry or source code), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for detecting edges in an image, the method comprising:
   smoothing the image using a filter;
   determining a gradient magnitude and angle for each pixel of the image;
   performing a non-maximum suppression; and
   applying a double threshold with an upper and a lower threshold for determining the edges in the image, where the upper and the lower threshold are calculated automatically using a distribution of intensity values of the image determined by using a histogram of the image divided into a predetermined number of bins;
   where:
      a normalized density function is determined for each bin resulting in a normalized probability density function, and
      the upper and the lower threshold are determined by using the following equations:

$T_1 = \max(0,(\mu-\sigma)/a)$ $T_2 = \min(A,(\mu+\sigma)/b)$ where:

$\mu$ is the mean value of the normalized probability density function,
   $\sigma$ is the variance of the probability density function,
   a is a parameter, between 5 and 7, preferably 6,
   b is a parameter between 2 and 4, preferably 3, and
   A is the maximum intensity value.

2. A computer program product having computer program code stored on a computer-readable non-transitory storage medium, the computer program code adapted to be executed to implement a method comprising the steps of:
   smoothing the image using a filter;
   determining a gradient magnitude and angle for each pixel of the image;
   performing a non-maximum suppression; and
   applying a double threshold with an upper and a lower threshold for determining the edges in the image, where the upper and the lower threshold are calculated automatically using a distribution of intensity values of the image determined by using a histogram of the image divided into a predetermined number of bins;
   where:
      a normalized density function is determined for each bin resulting in a normalized probability density function, and
      the upper and the lower threshold are determined by using the following equations:

$T_1 = \max(0,(\mu-\sigma)/a)$ $T_2 = \min(A,(\mu+\sigma)/b)$ where:

$\mu$ is the mean value of the normalized probability density function,
   $\sigma$ is the variance of the probability density function,
   a is a parameter between 5 and 7, preferably 6,
   b is a parameter between 2 and 4, preferably 3, and
   A is the maximum intensity value.

3. A computer-readable non-transitory storage medium having a computer program stored thereon, the computer program code adapted to be executed to implement a method comprising the steps of:
   smoothing the image using a filter;
   determining a gradient magnitude and angle for each pixel of the image;
   performing a non-maximum suppression; and
   applying a double threshold with an upper and a lower threshold for determining the edges in the image, where the upper and the lower threshold are calculated automatically using a distribution of intensity values of the image determined by using a histogram of the image divided into a predetermined number of bins;
   where:
      a normalized density function is determined for each bin resulting in a normalized probability density function, and
      the upper and the lower threshold are determined by using the following equations:

$T_1 = \max(0,(\mu-\sigma)/a)$ $T_2 = \min(A,(\mu+\sigma)/b)$ where:

$\mu$ is the mean value of the normalized probability density function,
   $\sigma$ is the variance of the probability density function,
   a is a parameter between 5 and 7, preferably 6,
   b is a parameter between 2 and 4, preferably 3, and
   A is the maximum intensity value.

4. An imaging system comprising:
   an image acquisition unit configured to acquire an image;
   an image processing unit configured to detect edges in the image by smoothing the image, determining a gradient magnitude and angle for each pixel of the image, performing a non-maximum suppression and applying a double threshold to determine the edges, where the image processing unit automatically calculates the upper and the lower threshold using a distribution of intensity values of the image determined by using a histogram of the image divided into a predetermined number of bins;
   where:
      a normalized density function is determined for each bin resulting in a normalized probability density function, and
      the upper and the lower threshold are determined by using the following equations:

$T_1 = \max(0,(\mu-\sigma)/a)$ $T_2 = \min(A,(\mu+\sigma)/b)$ where:

μ is the mean value of the normalized probability density function,
σ is the variance of the probability density function,
a is a parameter between 5 and 7, preferably 6,
b is a parameter between 2 and 4, preferably 3, and
A is the maximum intensity value.

5. The method of claim 1 where the mean value and the variance are determined as a first or second derivative of the normalized probability density function, respectively.

6. The method of claim 1 where the mean value, μ, is determined by:

$$\mu = \sum_{i=1}^{N} f_{norm}(i) \cdot x(i),$$

where:
N is a number of bins,
$f_{norm}(i)$ is a normalized density function for each bin i, and
x(i) is a center intensity value for each bin.

7. The method of claim 1 where the variance, $\sigma^2$, is determined by:

$$\sigma^2 = \sum_{i=1}^{N} f_{norm}(i) \cdot (x(i) - \mu)^2$$

where:
N is a number of bins,
$f_{norm}(i)$ is a normalized density function for each bin,
x(i) is a center intensity value for each bin.

8. A method for detecting an object on a road in an image taken in a vehicle, the method comprising:
acquiring the image;
determining a gradient magnitude and angle for each pixel of the image;
applying a double threshold to the image with an upper and a lower threshold for determining edges of the object, where the upper and the lower threshold are determined by a method comprising:
determining a histogram of the image;
dividing the histogram into a predetermined number of bins;
determining a center value for each bin;
determining a normalized density function for each bin;
determining a normalized probability density function from the normalized density function for each bin;
determining a mean value and a variance of the normalized probability density function; and
determining the upper and the lower threshold on the basis of the mean value and the variance by using the following equations:

$T_1 = \max(0,(\mu-\sigma)/a)$ $T_2 = \min(A,(\mu+\sigma)/b)$ where:

μ is the mean value of the normalized probability density function,
σ is the variance of the probability density function,
a is a parameter between 5 and 7, preferably 6,
b is a parameter between 2 and 4, preferably 3, and
A is the maximum intensity value.

9. The method of claim 1 further comprising the step of determining a center intensity value for each bin.

10. The method of claim 1 further comprising the step of determining the number of pixels contained in each bin, where the normalized density function is determined on the basis of the number of pixels in each bin and on the basis of the number of pixels in the image.

11. The method of claim 5 where the mean value is determined on the basis of the normalized density function of each bin and on the basis of the center intensity value for each bin.

12. The method of claim 1 where;
the edges are detected in a series of images, and
the upper and the lower threshold are calculated automatically for each image based on the distribution of intensity values of the corresponding image.

* * * * *